United States Patent
Tanimoto

(10) Patent No.: US 8,472,454 B2
(45) Date of Patent: *Jun. 25, 2013

(54) RELAY-SERVER ARRANGED TO CARRY OUT COMMUNICATIONS BETWEEN COMMUNICATION TERMINALS ON DIFFERENT LANS

(75) Inventor: Yoshifumi Tanimoto, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 50 days.

This patent is subject to a terminal disclaimer.

(21) Appl. No.: 11/853,943

(22) Filed: Sep. 12, 2007

(65) Prior Publication Data

US 2008/0063001 A1    Mar. 13, 2008

(30) Foreign Application Priority Data

Sep. 12, 2006   (JP) .................................. 2006-246905

(51) Int. Cl.
  *H04L 12/28*   (2006.01)
  *H04L 12/56*   (2006.01)
(52) U.S. Cl.
  USPC ........................................................ 370/401
(58) Field of Classification Search
  None
  See application file for complete search history.

(56) References Cited

U.S. PATENT DOCUMENTS

| | | | |
|---|---|---|---|
| 5,848,134 A | 12/1998 | Sekiguchi et al. | |
| 5,884,312 A | 3/1999 | Dustan et al. | |
| 6,061,796 A | 5/2000 | Chen et al. | |
| 6,111,883 A | 8/2000 | Terada et al. | |
| 6,145,084 A | 11/2000 | Zuili et al. | |
| 6,215,877 B1 | 4/2001 | Matsumoto | |
| 6,222,536 B1 | 4/2001 | Kihl et al. | |
| 6,226,692 B1 | 5/2001 | Miloushev et al. | |
| 6,237,023 B1 | 5/2001 | Yoshimoto | |
| 6,336,141 B1 | 1/2002 | Fujiyama et al. | |
| 6,538,773 B1 | 3/2003 | Brossman et al. | |
| 6,546,488 B2 | 4/2003 | Dillon et al. | |
| 6,574,656 B1 | 6/2003 | Nagaoka et al. | |

(Continued)

FOREIGN PATENT DOCUMENTS

| | | |
|---|---|---|
| EP | 1 054 547 A2 | 11/2000 |
| EP | 1 667 382 A1 | 6/2006 |

(Continued)

OTHER PUBLICATIONS

Tanimoto: "Relay Server and Relay Communication System," U.S. Appl. No. 12/335,642, filed Dec. 16, 2008.

(Continued)

*Primary Examiner* — Suk Jin Kang
(74) *Attorney, Agent, or Firm* — Keating & Bennett, LLP

(57) ABSTRACT

A technique of carrying out communications between communication terminals on different LANs while realizing reductions in the burden of account control and suppression in load on a server includes first and second relay servers on first and second LANs issuing a registration request to a SIP-server, respectively. A first communication terminal on the first LAN issues a registration request to the first relay server while a second communication terminal on the second LAN issues a registration request to the second relay server. The first and second relay servers exchange account information about the registered communication terminals with each other. When the first communication terminal generates communication data addressed to the second communication terminal, the first relay server selects the second relay server as a relay based on the exchanged account information to relay the communication data. Then, the second relay server relays the communication data to the second communication terminal.

11 Claims, 6 Drawing Sheets

U.S. PATENT DOCUMENTS

| | | |
|---|---|---|
| 6,594,246 B1 | 7/2003 | Jorgensen |
| 6,636,513 B1 | 10/2003 | Nishikawa et al. |
| 6,754,212 B1 | 6/2004 | Terada et al. |
| 6,757,365 B1 | 6/2004 | Bogard |
| 6,766,373 B1 | 7/2004 | Beadle et al. |
| 6,889,256 B1 | 5/2005 | Palevich et al. |
| 6,898,641 B1 | 5/2005 | Kobayashi |
| 6,950,879 B2 | 9/2005 | Zhou |
| 6,988,199 B2 | 1/2006 | Toh et al. |
| 7,000,248 B2 | 2/2006 | Mizukoshi |
| 7,120,927 B1 | 10/2006 | Beyda et al. |
| 7,139,811 B2 | 11/2006 | Lev Ran et al. |
| 7,174,378 B2 | 2/2007 | Yoon et al. |
| 7,206,088 B2 | 4/2007 | Tanimoto |
| 7,647,388 B2 | 1/2010 | Kato |
| 7,813,299 B2 * | 10/2010 | Yumoto et al. ............... 370/254 |
| 8,065,418 B1 | 11/2011 | Abuan et al. |
| 2001/0044819 A1 | 11/2001 | Gong |
| 2001/0047414 A1 | 11/2001 | Yoon et al. |
| 2002/0023143 A1 | 2/2002 | Stephenson et al. |
| 2002/0032616 A1 | 3/2002 | Suzuki et al. |
| 2002/0059436 A1 | 5/2002 | Kubo |
| 2002/0073182 A1 | 6/2002 | Zakurdaev et al. |
| 2002/0095506 A1 | 7/2002 | Tanimoto |
| 2002/0143922 A1 | 10/2002 | Tanimoto |
| 2002/0143956 A1 | 10/2002 | Tanimoto |
| 2002/0143957 A1 | 10/2002 | Tanimoto |
| 2002/0143960 A1 | 10/2002 | Goren et al. |
| 2002/0146002 A1 | 10/2002 | Sato |
| 2002/0152299 A1 | 10/2002 | Traversat et al. |
| 2003/0140637 A1 | 7/2003 | Masui et al. |
| 2003/0144872 A1 | 7/2003 | Masui et al. |
| 2003/0217165 A1 * | 11/2003 | Buch et al. ............... 709/229 |
| 2004/0034521 A1 * | 2/2004 | Kawakura et al. ............... 704/1 |
| 2004/0078426 A1 | 4/2004 | Nagami et al. |
| 2004/0083385 A1 | 4/2004 | Ahmed et al. |
| 2004/0148432 A1 | 7/2004 | Udono et al. |
| 2004/0172395 A1 | 9/2004 | Edelstein et al. |
| 2004/0218611 A1 | 11/2004 | Kim |
| 2004/0255048 A1 | 12/2004 | Lev Ran et al. |
| 2004/0267939 A1 * | 12/2004 | Yumoto et al. ............... 709/227 |
| 2005/0076098 A1 | 4/2005 | Matsubara et al. |
| 2005/0281251 A1 * | 12/2005 | Yumoto et al. ............... 370/352 |
| 2006/0083171 A1 * | 4/2006 | Tanaike et al. ............... 370/238 |
| 2006/0153171 A1 * | 7/2006 | Sakai ............... 370/352 |
| 2006/0187902 A1 * | 8/2006 | Birch et al. ............... 370/352 |
| 2006/0209794 A1 * | 9/2006 | Bae et al. ............... 370/352 |
| 2006/0256771 A1 * | 11/2006 | Yarlagadda ............... 370/352 |
| 2006/0282540 A1 | 12/2006 | Tanimoto |
| 2007/0019545 A1 * | 1/2007 | Alt et al. ............... 370/230 |
| 2007/0019622 A1 * | 1/2007 | Alt et al. ............... 370/352 |
| 2007/0019623 A1 * | 1/2007 | Alt et al. ............... 370/352 |
| 2007/0022477 A1 | 1/2007 | Larson |
| 2007/0036143 A1 * | 2/2007 | Alt et al. ............... 370/352 |
| 2007/0058617 A1 * | 3/2007 | Stiemerling et al. ............... 370/352 |
| 2007/0064896 A1 * | 3/2007 | Chang et al. ............... 379/156 |
| 2007/0106795 A1 * | 5/2007 | Gilfix et al. ............... 709/226 |
| 2007/0192434 A1 * | 8/2007 | Kodama et al. ............... 709/218 |
| 2007/0201493 A1 * | 8/2007 | Yamada et al. ............... 370/401 |
| 2007/0233844 A1 | 10/2007 | Tanimoto |
| 2007/0253418 A1 * | 11/2007 | Shiri et al. ............... 370/392 |
| 2007/0258451 A1 * | 11/2007 | Bouat ............... 370/389 |
| 2007/0268896 A1 * | 11/2007 | Oyama et al. ............... 370/389 |
| 2007/0274329 A1 | 11/2007 | Takeyoshi et al. |
| 2008/0089349 A1 | 4/2008 | Tanimoto |
| 2008/0098088 A1 | 4/2008 | Tamano et al. |
| 2008/0137672 A1 | 6/2008 | Tanimoto |
| 2008/0225839 A1 * | 9/2008 | Gobara et al. ............... 370/389 |
| 2008/0288591 A1 | 11/2008 | Tanimoto |
| 2008/0298367 A1 | 12/2008 | Furukawa |
| 2009/0067410 A1 * | 3/2009 | Sterman et al. ............... 370/352 |

FOREIGN PATENT DOCUMENTS

| | | |
|---|---|---|
| JP | 56-025880 A | 3/1981 |
| JP | 61-225957 A | 10/1986 |
| JP | 04-105143 A | 4/1992 |
| JP | 09-168055 A | 6/1997 |
| JP | 09-214486 A | 8/1997 |
| JP | 09-282216 A | 10/1997 |
| JP | 10-126440 A | 5/1998 |
| JP | 10-177548 A | 6/1998 |
| JP | 11-234270 A | 8/1999 |
| JP | 11-313059 A | 11/1999 |
| JP | 2000-059465 A | 2/2000 |
| JP | 2000-115167 A | 4/2000 |
| JP | 2001-014254 A | 1/2001 |
| JP | 2001-027978 A | 1/2001 |
| JP | 2001-092702 A | 4/2001 |
| JP | 2001-184289 A | 7/2001 |
| JP | 2001-292167 A | 10/2001 |
| JP | 2001-306382 A | 11/2001 |
| JP | 2002-007182 A | 1/2002 |
| JP | 2002-141952 A | 5/2002 |
| JP | 2002-149519 A | 5/2002 |
| JP | 2002-199150 A | 7/2002 |
| JP | 2002-217943 A | 8/2002 |
| JP | 2002-247036 A | 8/2002 |
| JP | 2002-288415 A | 10/2002 |
| JP | 2002-314573 A | 10/2002 |
| JP | 2003-032310 A | 1/2003 |
| JP | 2004-139291 A | 5/2004 |
| JP | 2004-201255 A | 7/2004 |
| JP | 2004-213533 A | 7/2004 |
| JP | 2004-229299 A | 8/2004 |
| JP | 2004-265415 A | 9/2004 |
| JP | 2004-310371 A | 11/2004 |
| JP | 2005-027040 A | 1/2005 |
| JP | 2005-086520 A | 3/2005 |
| JP | 2005-115943 A | 4/2005 |
| JP | 2005-157699 A | 6/2005 |
| JP | 2005-167608 A | 6/2005 |
| JP | 2005-267658 A | 9/2005 |
| JP | 2005-328239 A | 11/2005 |
| JP | 2006-033105 A | 2/2006 |
| JP | 2006-268138 A | 10/2006 |
| JP | 2006-337021 A | 12/2006 |
| JP | 2006-343943 A | 12/2006 |
| JP | 2007-104440 A | 4/2007 |
| JP | 2007-265135 A | 10/2007 |
| JP | 2007-267136 A | 10/2007 |
| JP | 2007-310508 A | 11/2007 |
| JP | 2008-098699 A | 4/2008 |
| JP | 2008-098888 A | 4/2008 |
| JP | 2008-148046 A | 6/2008 |
| JP | 2008-148125 A | 6/2008 |
| JP | 2008-148200 A | 6/2008 |
| JP | 2008-154101 A | 7/2008 |
| JP | 2008-306500 A | 12/2008 |
| JP | 2009-027652 A | 2/2009 |
| JP | 2009-163300 A | 7/2009 |
| JP | 2009-163302 A | 7/2009 |
| JP | 2009-252159 A | 10/2009 |
| JP | 2009-265919 A | 11/2009 |
| JP | 2010-178089 A | 8/2010 |
| JP | 2010-256989 A | 11/2010 |
| JP | 2010-267084 A | 11/2010 |
| JP | 2010-278636 A | 12/2010 |
| JP | 2011-055452 A | 3/2011 |
| JP | 2011-055453 A | 3/2011 |
| JP | 2011-055454 A | 3/2011 |
| JP | 2011-160103 A | 8/2011 |
| WO | 00/69140 A | 11/2000 |
| WO | 2006/090465 A1 | 8/2006 |

OTHER PUBLICATIONS

Tanimoto: "Relay Server and Relay Communication System," U.S. Appl. No. 12/335,661, filed Dec. 16, 2008.

Tanimoto: "Relay Server and Relay Communication System," U.S. Appl. No. 12/340,868, filed Dec. 22, 2008.

Official communication issued in counterpart European Application No. 07016214.4, mailed on Jan. 25, 2008.

Goode, "Voice Over Internet Protocol (VoIP)," Proceedings of the IEEE; vol. 90; No. 9; Sep. 2002; pp. 1495-1517.

Tanimoto: "File Server Device," U.S. Appl. No. 11/862,654, filed Sep. 27, 2007.

Tanimoto: "File Transfer Server," U.S. Appl. No. 11/870,622, filed Oct. 11, 2007.
Tanimoto: "Relay Server and Client Terminal," U.S. Appl. No. 11/953,351, filed Dec. 10, 2007.
Tanimoto: "Relay Server, Relay Communication System, and Communication Device," U.S. Appl. No. 11/944,495, filed Nov. 23, 2007.
Tanimoto: "Relay Server and Relay Communication System," U.S. Appl. No. 11/953,505, filed Dec. 10, 2007.
Tanimoto: "Relay Server and Relay Communication System," U.S. Appl. No. 12/103,933, filed Apr. 16, 2008.
Tanimoto: "Relay Server and Relay Communication System," U.S. Appl. No. 12/112,127, filed Apr. 30, 2008.
Tanimoto: "Relay Server and Relay Communication System," U.S. Appl. No. 12/107,793, filed Apr. 23, 2008.
Tanimoto; "Relay Server, Communication System and Facsimile System"; U.S. Appl. No. 10/045,698, filed Jan. 10, 2002.
Tanimoto; "Relay Server, Communication System and Facsimile System"; U.S. Appl. No. 10/045,897, filed Jan. 10, 2002.
Tanimoto; "Relay Server for Relaying Communications Between Network Devices"; U.S. Appl. No. 10/114,720, filed Apr. 1, 2002.
Tanimoto; "Relay Server"; U.S. Appl. No. 10/114,963, filed Apr. 2, 2002.
Tanimoto; "Relay Server, Network Device, Communication System, and Communication Method"; U.S. Appl. No. 10/116,615, filed Apr. 2, 2002.
Masuda et al.; "Multicast Network Control for Streaming Data Broadcasting", IEICE Technical Report, vol. 100, No. 672; pp. 327-334; Mar. 9, 2001.
"An Old-Timer of Character Chat IRC"; Mac Fan Internet; vol. 4, No. 6; p. 33; Jun. 1999.
Official communication issued in counterpart Japanese Application No. 2006-246905, mailed on Aug. 25, 2008.
Izumi: "Present TCP/IP and Full Gamut of VOIP Technique," Interface; CQ Publication Inc.; Jun. 1, 2003; vol. 29, No. 6; pp. 66-78.
Kurayama, SIP (session initiation protocol), Nikkei Communications, Sep. 22, 2003, pp. 150-158 (partial translation of pp. 155 and 156 (Usable in IM and Presence Notification)).
Tanimoto, "Relay Server and Relay Communcation System," U.S. Appl. No. 12/270,883, filed Nov. 14, 2008.
Official Communication issued in corresponding Japanese Patent Application No. 2006-335512, mailed on Aug. 2, 2011.
Official Communication issued in corresponding Japanese Patent Application No. 2006-090693, mailed on Aug. 2, 2011.
Official Communication issued in U.S. Appl. No. 11/723,466, mailed on Nov. 8, 2010.
Tanimoto; "Relay Device and Communication System"; U.S. Appl. No. 11/723,466, filed Mar. 20, 2007.
Official Communication issued in International Patent Application No. PCT/JP2010/001594, mailed on Mar. 30, 2010.
Official Communication issued in International Patent Application No. PCT/JP2010/003240, mailed on Jun. 15, 2010.
Official Communication issued in International Patent Application No. PCT/JP2010/005041, mailed on Nov. 22, 2010.
Official Communication issued in International Patent Application No. PCT/JP2010/005679, mailed on Oct. 26, 2010.
Official Communication issued in International Patent Application No. PCT/JP2010/005680, mailed on Oct. 26, 2010.
Hitoshi, "Network World", vol. 9, No. 12, Dec. 1, 2004, pp. 148-150.
Official Communication issued in corresponding Japanese Patent Application No. 2007-339311, mailed on Apr. 8, 2011.
"Error & Warning Message Ways of Coping, Nikkei Personal Computer", Nikkei Business Publications, Inc., May 10, 2007.
Official Communication issued in corresponding European Patent Application No. 08007866.0, mailed on Apr. 19, 2011.
Tanimoto, "First Relay Server and Second Relay Server", U.S. Appl. No. 13/255,958, filed Sep. 12, 2011.
English translation of Official Communication issued in corresponding Japanese Patent Application No. 2006-334652, mailed on Jun. 8, 2010.
English translation of Official Communication issued in corresponding Japanese Patent Application No. 2007-152122, mailed on Jun. 2, 2010.
Tanimoto, "Relay Server and Relay Communication System", U.S. Appl. No. 13/061,234, filed Feb. 28, 2011.
Tanimoto, "Relay Server, Relay Communication System, and Communication Apparatus", U.S. Appl. No. 13/061,725, filed Mar. 2, 2011.
Tanimoto, "Relay Device and Communication System", U.S. Appl. No. 13/341,711, filed Dec. 30, 2011.
Tanimoto, "Relay Communication System and First Relay Server," U.S. Appl. No. 13/320,034, filed Nov. 11, 2011.
Tanimoto et al., "Relay Communication System and Access Management Apparatus," U.S. Appl. No. 13/390,561, filed Feb. 15, 2012.
Tanimoto, "Relay Server and Relay Communication System," U.S Appl. No. 13/496,664, filed Mar. 16, 2012.
Official Communication issued in corresponding Japanese Patent Application No. 2009-205183, mailed on Feb. 3, 2012.
Official Communication issued in corresponding Japanese Patent Application No. 2009-205191, mailed on Feb. 3, 2012.
Official Communication issued in corresponding Japanese Patent Application No. 2009-201775, mailed on Feb. 7, 2012.
Tanimoto, "Relay Server and Relay Communication System Arranged to Share Resources Between Networks." U.S. Appl. No. 13/153,497, filed Jun. 6, 2011.

* cited by examiner

RELAY-SERVER ARRANGED TO CARRY OUT COMMUNICATIONS BETWEEN COMMUNICATION TERMINALS ON DIFFERENT LANS

CROSS-REFERENCE TO RELATED APPLICATIONS

This application claims priority under 35 U.S.C. 119 to Japanese Patent Application No. 2006-246905, filed on Sep. 12, 2006, which application is hereby incorporated by reference in its entirety.

BACKGROUND OF THE INVENTION

1. Field of the Invention

The present invention relates to a technique of carrying out communications between communication terminals on different local area networks (LANs), through a wide area network (WAN).

2. Description of Related Art

Use of a call control protocol such as a SIP (Session Initiation Protocol) or a DDNS (Dynamic Domain Name System) allows communication terminals on different LANs to directly carry out communications with each other through a WAN. Such a technique is referred to as a so-called VPN (Virtual Private Network). According to this technique, different remote LANs can be used as a directly-connected network.

Use of the technique allows, for example, connection between a LAN in a head office and a LAN in a branch office, so that terminals on the different LANs can carry out communications with each other through the Internet.

There has been known a technique capable of carrying out communications between communication terminals on different LANs, through the Internet. According to this technique, the different communication terminals on the different LANs log in to relay servers connected to the Internet via gateways so as to establish communication paths to the relay servers, respectively. Use of the communication paths allows the communication terminals to carry out communications with each other through the Internet. This technique allows communications between LANs via relay servers on a WAN.

In a case of using a SIP, typically, account information of each communication terminal is registered in a SIP-server. More specifically, when each communication terminal issues a REGISTER method to the SIP-server, the account information is registered in the SIP-server. Then, if one communication terminal makes a communication request which designates an account of another communication terminal, the SIP-server relays communications for establishment of a session in accordance with the registered account information.

If communications are carried out among plural LANs using the SIP, plural pieces of account information are registered in the SIP-server, leading to an increase in load imposed on the server. In order to carry out communications among plural LANs connected to one another, conventionally, accounts of all the LANs have been registered in a server which collectively controls the LANs. Consequently, a large load has been imposed on the server.

Moreover, each of the communication terminals needs to recognize an account of another communication terminal on a separate LAN in order to carry out communications with the other communication terminal. When the respective communication terminals access the server to acquire such account information, the load imposed on the server becomes larger. Further, since the server registers therein the accounts of the communication terminals on the plural LANs, each communication terminal requires a mechanism for readily retrieving the account of a target communication terminal from among the plural accounts.

In a case that the server collectively controls the account information, additionally, the account information of the communication terminals on all the LANs must be made unique. In other words, each LAN cannot obtain an account freely. Consequently, a degree of freedom inconveniently becomes small in terms of network control.

SUMMARY OF THE INVENTION

In order to solve the problems described above, preferred embodiments of the present invention provide a technique capable of carrying out communications between communication terminals on different LANs while realizing reduction in the burden of account control, suppression in load imposed on a server and facilitation of the account control.

In order to overcome the problems described above, a preferred embodiment of the present invention provides a relay server which is placed on a local area network and can carry out communications with an external server on a wide area network. The relay server preferably includes a local account information registration section arranged to register therein account information of a communication terminal on the local area network, a registration section arranged to register account information of the relay server in the external server, a construction section arranged to designate another relay server registered in the external server to construct a relaying communication session for direct communications with the another relay server, and an exchange section arranged to exchange the account information stored in the local account information registration section with the another relay server. Upon reception from the communication terminal on the local area network, a communication request designating an account of another communication terminal, the relay server determines a relay server registering therein the designated account from the account information exchanged with the another relay server, and relays communication data between the communication terminals via the relaying communication session with the relevant relay server.

According to a preferred embodiment of the present invention, the relay server holds the account information acquired by the exchange with the another relay server while bringing the account information into correspondence with the account information of the another relay server.

According to a preferred embodiment of the present invention, the relay server relays the communication data between the communication terminals at an application protocol level higher in order than a TCP/IP (Transmission Control Protocol/Internet Protocol).

The relay server according to a preferred embodiment of the present invention is preferably placed on each local area network. The relay server constructs the relaying communication session for direct communications with the another relay server registered in the external server, and exchanges the account information with the another relay server. Upon reception from the communication terminal the communication request designating the account of the another communication terminal, the relay server determines the relay server registering therein the designated account from the account information exchanged with the another relay server, and relays the communication data between the communication terminals via the relaying communication session with the relevant relay server.

With this configuration, the relay servers control the accounts of the communication terminals in a distributed manner, which makes it possible to lessen a load imposed on the external server performing account control. Further, each communication terminal accesses the relay server, thereby acquiring account information of another communication terminal on a separate local area network.

In addition, the relay server holds the account information acquired by the exchange with the another relay server while bringing the account information into correspondence with the account information of the another relay server. Thus, an account can be freely provided to each local area network. Therefore, collective control of accounts becomes unnecessary in the entire system, so that the account can be readily controlled.

Further, the relay server relays the communication data between the communication terminals at the application protocol level higher in order than the TCP/IP. Therefore, relay communications become possible between different networks by an existing network system.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
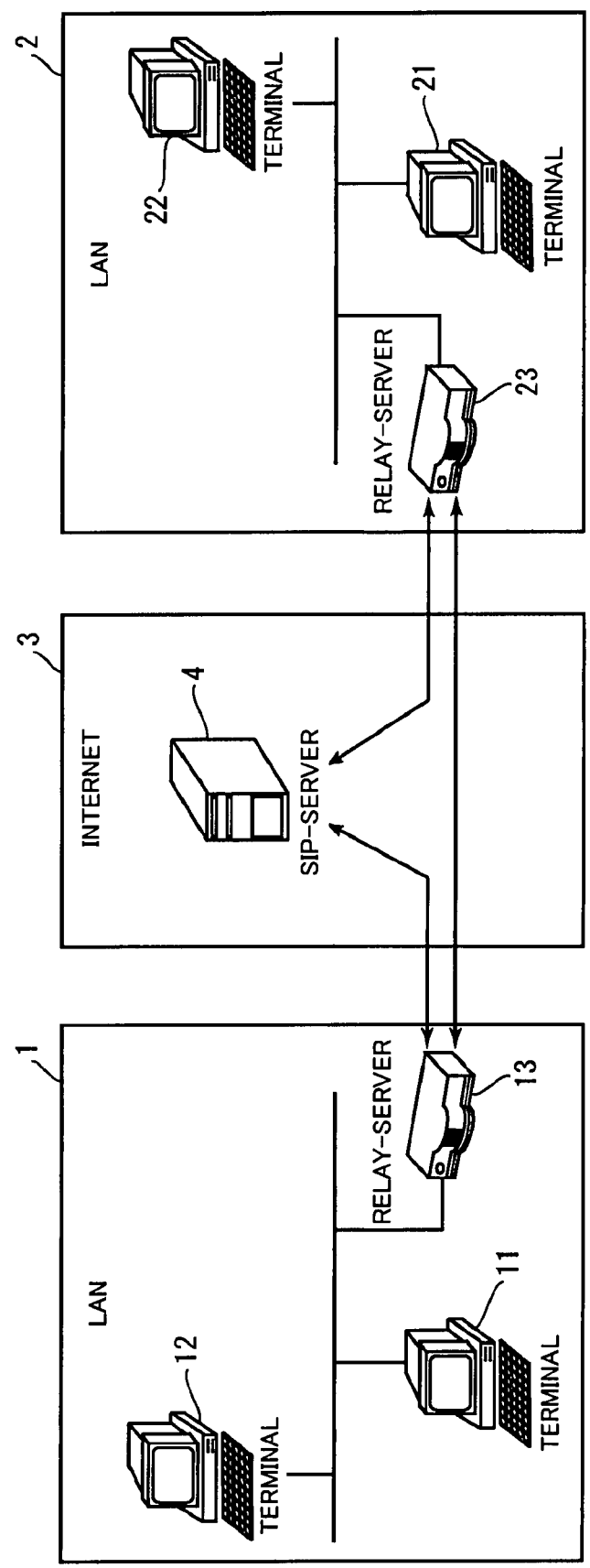
FIG. 1 illustrates a network configuration of a communication system according to a preferred embodiment of the present invention.

Hereinafter, description will be provided of preferred embodiments of the present invention with reference to the drawings. FIG. 1 illustrates a general configuration of a communication system according to a preferred embodiment of the present invention. This communication system preferably includes the Internet 3 and two LANs 1, 2 each connected to the Internet 3, for example. The LANs 1 and 2 correspond to networks constructed at physically separate places, respectively. For example, the LAN 1 corresponds to a local area network constructed in a head-office building and the LAN 2 corresponds to a local area network constructed in a branch-office building. The LANs 1 and 2 are connected to the Internet 3 which is a global network, respectively.

As illustrated in FIG. 1, communication terminals 11 and 12 are connected to the LAN 1. Each of the communication terminals 11 and 12 has a private IP address. As described above, typically, a terminal connected to a LAN has a private IP address which is uniquely controlled only in the LAN. In addition, a relay server 13 is connected to the LAN 1. The relay server 13 is not only connected to the LAN 1, but is also connected to the Internet 3. The relay server 13 has a private IP address for a LAN interface and a global IP address for a WAN interface.

Communication terminals 21 and 22 each having a private IP address are connected to the LAN 2. Further, a relay server 23 is connected to the LAN 2. The relay server 23 is not only connected to the LAN 2, but is also connected to the Internet 3. The relay server 23 has a private IP address for a LAN interface and a global IP address for a WAN interface.

Further, a SIP-server 4 is connected to the Internet 3. The SIP-server 4 serves as a proxy server for relaying a SIP method or a response when the relay servers 13 and 23 carry out communications with each other through a SIP (Session Initiation Protocol), and serves as a SIP registrar server for registering therein the accounts of the relay servers 13 and 23.

On the other hand, the relay server 13 connected to the LAN 1 serves as a SIP registrar server for registering therein the accounts of the communication terminals 11 and 12 connected to the LAN 1 through the SIP.

Figure 2:
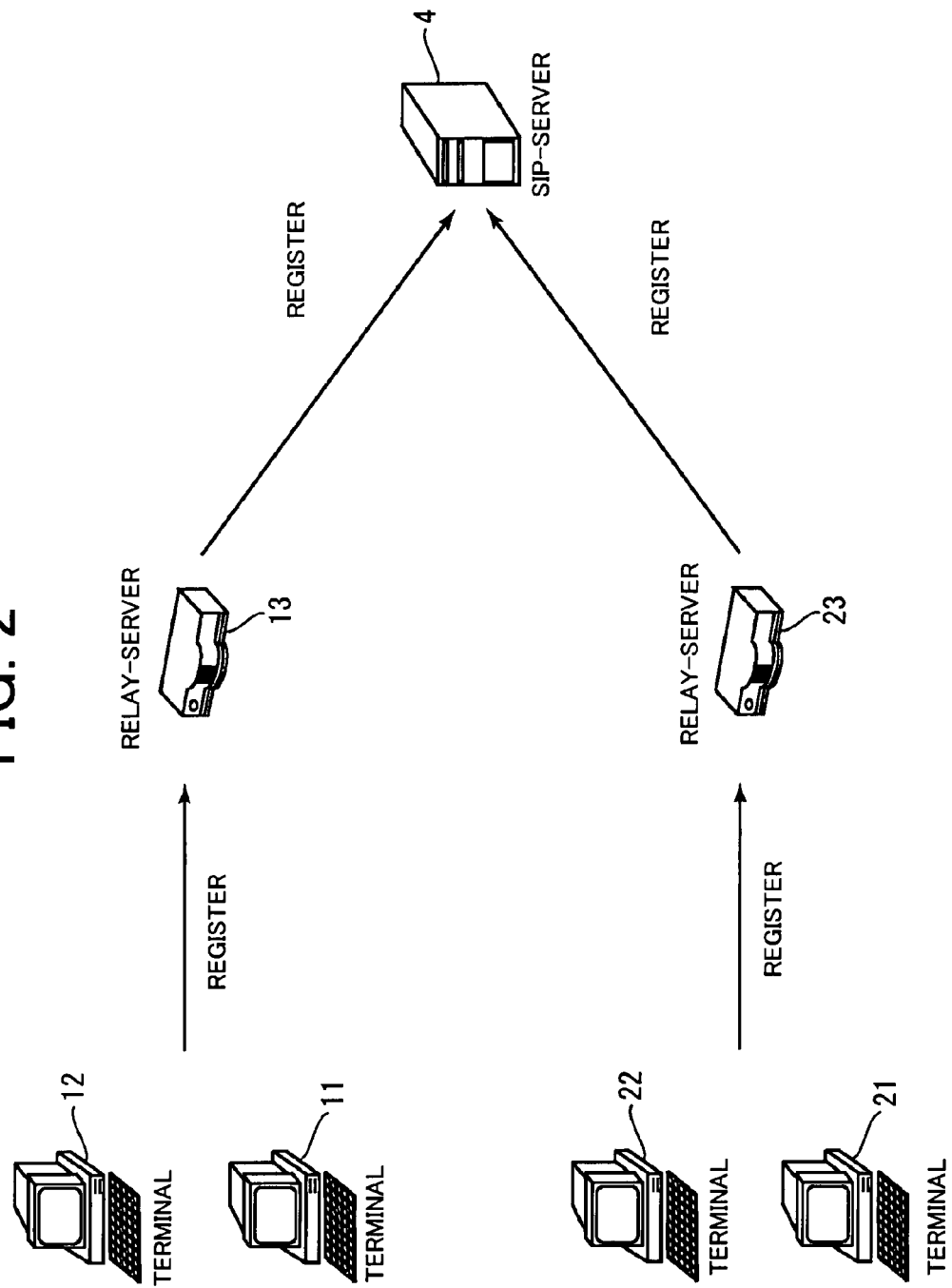
FIG. 2 illustrates a relationship between a communication terminal and a relay server and a relationship between the relay server and a SIP-server.

More specifically, as illustrated in FIG. 2, the relay server 13 serves as a SIP registrar server for registering therein the accounts on the basis of reception of registration requests (REGISTER) from the communication terminals 11 and 12, in terms of a relationship with the communication terminals 11 and 12, and serves as a client for sending an account registration request (REGISTER) to the SIP-server 4, in terms of a relationship with the SIP-server 4.

Likewise, the relay server 23 connected to the LAN 2 serves as a SIP registrar server for registering therein the accounts of the communication terminals 21 and 22 connected to the LAN 2 through the SIP.

More specifically, as illustrated in FIG. 2, the relay server 23 serves as a SIP registrar server for registering therein the accounts on the basis of reception of registration requests (REGISTER) from the communication terminals 21 and 22, in terms of a relationship with the communication terminals 21 and 22, and serves as a client for sending an account registration request (REGISTER) to the SIP-server 4, in terms of a relationship with the SIP-server 4.

Figure 3:
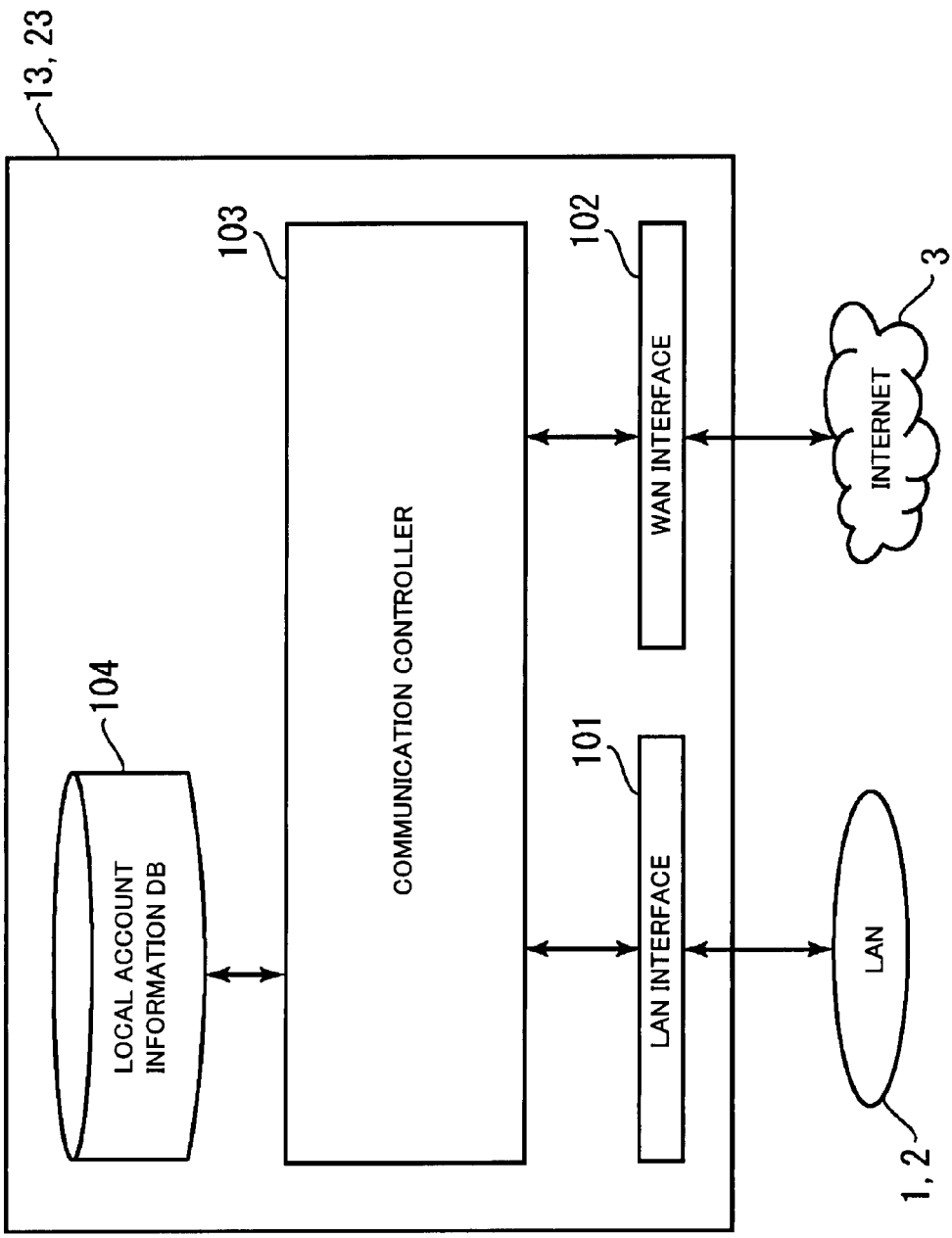
FIG. 3 illustrates a functional block diagram of the relay server.

FIG. 3 illustrates a functional block diagram of the relay servers 13 and 23. The relay servers 13 and 23 are similar in functions to each other; therefore, description thereof will be provided with reference to the single drawing. Each of the relay servers 13 and 23 includes a LAN interface 101, a WAN interface 102, a communication controller 103 and a local account information database 104.

The LAN interface 101 uses a private IP address to carry out communications with a communication terminal connected to a LAN. That is, the relay server 13 carries out communications with the communication terminals 11 and 12 through the LAN interface 101, and the relay server 23 carries out communications with the communication terminals 21 and 22 through the LAN interface 101.

The WAN interface 102 uses a global IP address to carry out communications with the SIP-server 4 connected to the Internet 3 which is a global network as well as other communication servers and communication terminals each connected to the Internet 3. In this preferred embodiment, the relay server has the WAN interface 102. However, connection with the WAN may be performed through a router and the relay server may be placed under the router.

The communication controller 103 is a processor arranged to control various communications carried out through the LAN interface 101 and the WAN interface 102. The communication controller 103 controls various types of communication processing according to protocols such as a TCP/IP (Transmission Control Protocol/Internet Protocol), a UDP (User Datagram Protocol) and a SIP.

The communication controller 103 has a function of receiving an account registration request (REGISTER) from the communication terminal connected to the LAN, and registering account information of the communication terminal in the local account information database 104. For example, the relay server 13 receives the account registration request (REGISTER) from the communication terminal 11, and registers the account information of the communication terminal 11 in the local account information database 104.

Further, the communication controller 103 executes processing for exchanging the account information registered in the local account information database 104 with another relay server. As will be described later, this processing is executed by a MESSAGE method. The exchange of the account information by this MESSAGE method is performed periodically, for example. Alternatively, the exchange of the account information may be performed through an operation by an operator.

Further, the communication controller 103 has a function of sending to the SIP-server 4 a registration request (REGISTER) for registering an account of the relay server itself.

In addition, the communication controller 103 has a function of maintaining connection of a tunneling session between the relay servers 13 and 23. That is, transmission of an INVITE method of the SIP from one of the relay servers 13 and 23 can establish the tunneling session between the relay servers 13 and 23. The communication controllers 103 of the relay servers 13 and 23 maintain the established tunneling session, thereby relaying communication data between the communication terminals connected to the LANs 1 and 2.

That is, the communication terminals connected to the LANs 1 and 2 have private accounts, respectively, as will be described later. Therefore, the communication terminals on the respective LANs 1 and 2 designate the mutual private accounts in order to carry out communications with each other. However, communication data such as a SIP command for designating such a private account is encapsulated while being transmitted through the path between the relay servers 13 and 23 and then is sent to one of the relay servers 13 and 23. Upon reception of the communication data, the relay server 13 or 23 extracts the SIP command, and then sends the communication data for designating the private account to the relevant communication terminal.

Figure 4:
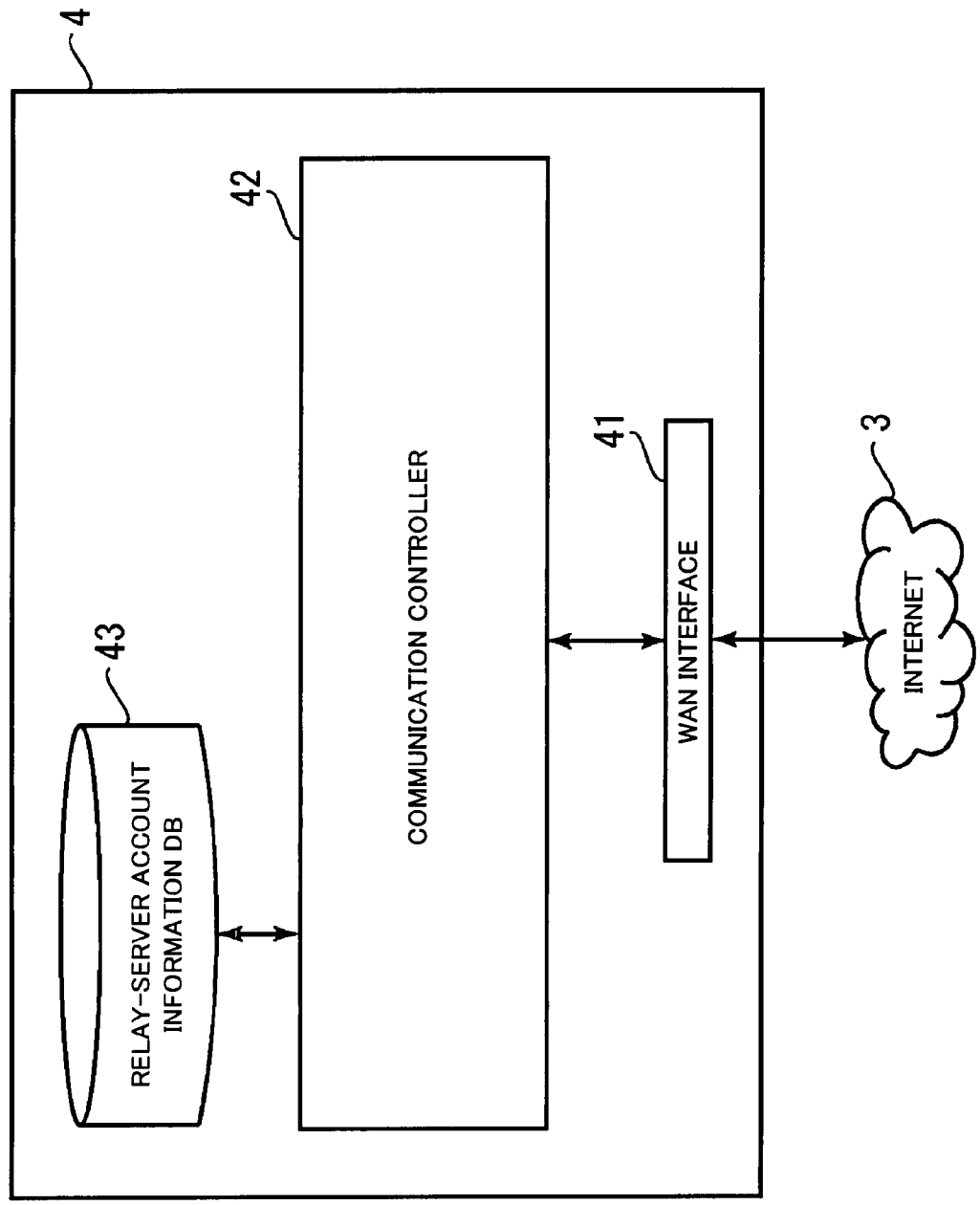
FIG. 4 illustrates a functional block diagram of the SIP-server.

FIG. 4 illustrates a functional block diagram of the SIP-server 4. As illustrated in FIG. 4, the SIP-server 4 includes a WAN interface 41, a communication controller 42 and a relay server account information database 43.

The WAN interface 41 uses a global IP address to carry out communications between the server and the terminal each connected to the Internet 3. The SIP-server 4 can carry out communications with the relay servers 13 and 23 through the WAN interface 41.

The communication controller 42 is a processor for controlling various communications carried out through the WAN interface 41. The communication controller 42 controls communication processing according to a protocol such as a TCP/IP, a UDP or a SIP.

The communication controller 42 has a function of receiving an account registration request (REGISTER) from the relay server connected to the Internet 3, and registering the account information of the relay server in the relay server account information database 43. For example, the SIP-server 4 receives the account registration request (REGISTER) from the relay server 13, and registers the account information of the relay server 13 in the relay server account information database 43.

In addition, the communication controller 42 has a function of relaying various communication data such as a SIP method and a response from one of the relay servers 13 and 23 to the other relay server.

Figure 5:
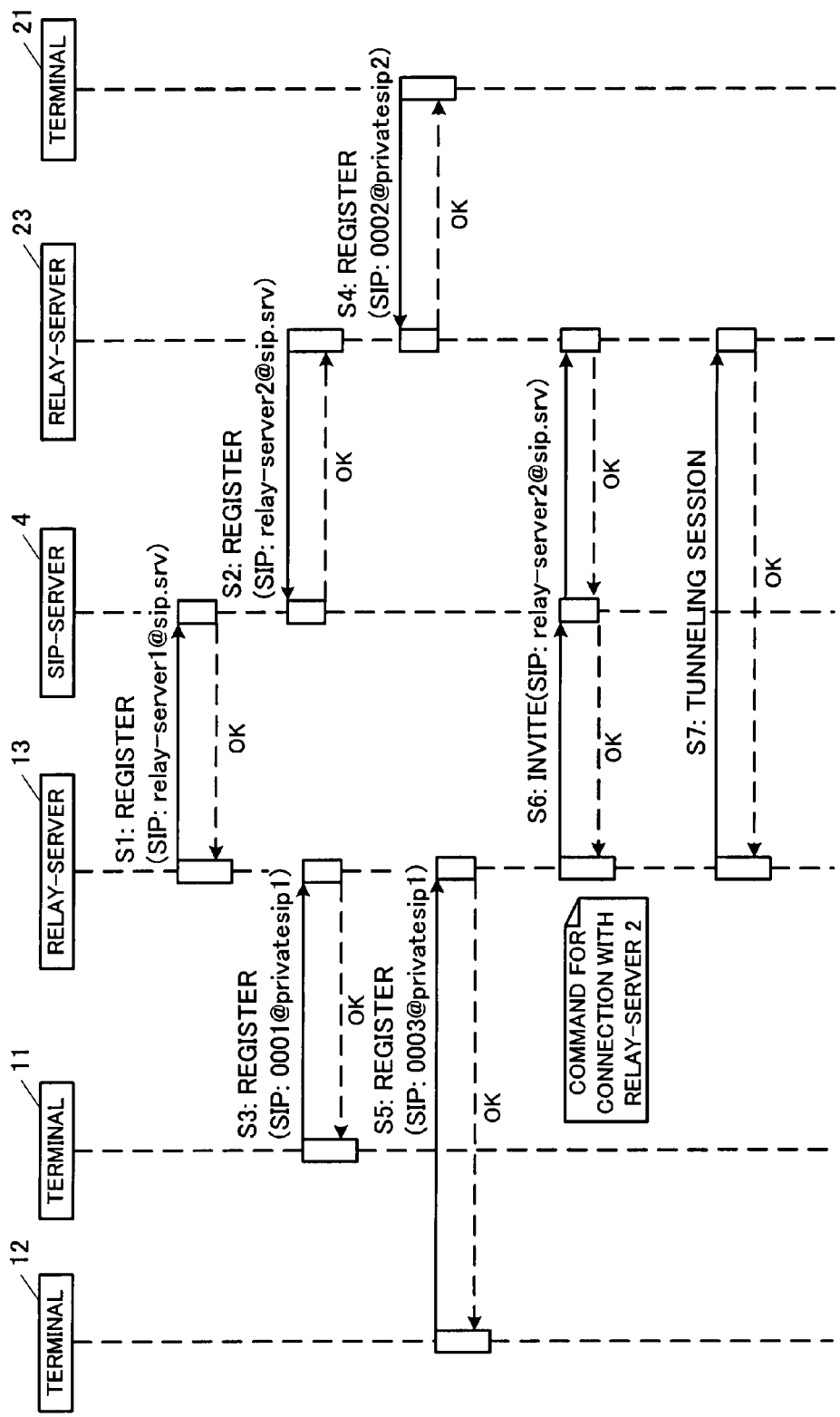
FIG. 5 illustrates a sequence of communication processing.
Figure 6:
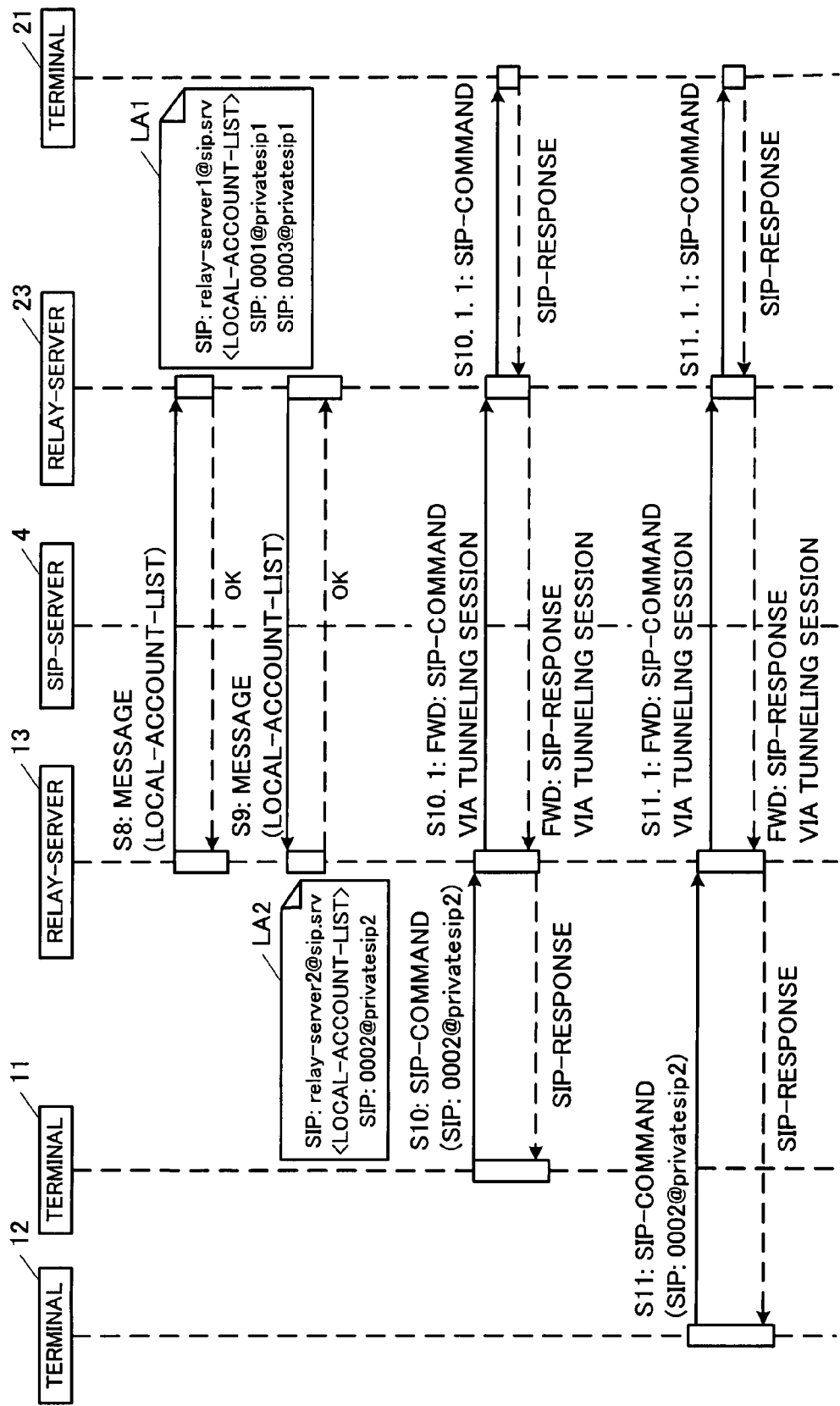
FIG. 6 illustrates a sequence of the communication processing.

With reference to processing sequence diagrams in FIGS. 5 and 6, description will be provided of a flow of the communication processing in the communication system configured as described above. FIG. 5 illustrates a sequence from step S1 to step S7, and FIG. 6 illustrates a sequence from step S8, which is subsequent to step S7, to step S11.

First, the relay server 13 sends an account registration request (REGISTER) to the SIP-server 4 (step S1). As illustrated in FIG. 5, herein, the relay server 13 makes a registration request of an account (SIP:relay server1@sip.srv) thereof. The SIP-server 4 sends back an OK response to the relay server 13, and registers the account of the relay server 13 in the relay server account information database 43 while bringing the account of the relay server 13 into correspondence with the global IP address of the relay server 13. If password authentication is used, a password that has been previously registered in the relay server account information database 43 is brought into correspondence with the account of the relay server 13. In such a case, a user sends the password when the relay server 13 makes the registration request. If the password is successfully authenticated, the account is registered while being brought into correspondence with the IP address.

Next, the relay server 23 sends an account registration request (REGISTER) to the SIP-server 4 (step S2). As illustrated in FIG. 5, the relay server 23 makes a registration request of an account (SIP:relay server2@sip.srv) thereof. The SIP-server 4 sends back an OK response to the relay server 23, and registers the account of the relay server 23 in the relay server account information database 43 while bringing the account of the relay server 23 into correspondence with the global IP address of the relay server 23. Similarly, the password authentication may be performed here.

Next, the communication terminal 11 sends an account registration request (REGISTER) to the relay server 13 (step S3). As illustrated in FIG. 5, the communication terminal 11 makes a registration request of an account (SIP:0001@privatesip1) thereof. The relay server 13 sends back an OK response to the communication terminal 11, and registers the account of the communication terminal 11 in the local account information database 104 while bringing the account of the communication terminal 11 into correspondence with the local IP address of the communication terminal 11. If password authentication is used, a password that has been previously registered in the local account information database 104 is brought into correspondence with the account of the communication terminal. In such a case, a user sends the password when the communication terminal makes the registration request. If the password is successfully authenticated, the account is registered while being brought into correspondence with the IP address.

Next, the communication terminal 21 sends an account registration request (REGISTER) to the relay server 23 (step S4). As illustrated in FIG. 5, the communication terminal 21 makes a registration request of an account (SIP:0002@privatesip2) thereof. The relay server 23 sends back an OK response to the communication terminal 21, and registers the account of the communication terminal 21 in the local account information database 104 while bringing the account of the communication terminal 21 into correspondence with the local IP address of the communication terminal 21. Similarly, password authentication may be performed here.

Next, the communication terminal 12 sends an account registration request (REGISTER) to the relay server 13 (step S5). The relay server 13 registers an account (SIP:0003@privatesip1) of the communication terminal 12 in the local account information database 104 while bringing the account of the communication terminal 12 into correspondence with the local IP address of the communication terminal 12.

Thus, the registration of the accounts of the relay servers 13 and 23 in the SIP-server 4 is completed, and the registration of the accounts of the communication terminals 11, 12 and 21 in the relay servers 13 and 23 is completed.

Next, the relay server 13 sends a connection request command (INVITE method) for the relay server 23 to the SIP-server 4 (step S6). In this INVITE method, the relay server 13 designates the account (SIP:relay server2@sip.srv) of the relay server 23 which receives the connection request. The SIP-server 4 refers to the relay server account information database 43, thereby acquiring the global IP address of the relay server 23. Then, the SIP-server 4 relays the INVITE method from the relay server 13 to the relay server 23.

As described above, when the relay server 13 sends the connection request command to the relay server 23, the relay server 23 sends back an OK response to the relay server 13 via the SIP-server 4. Thus, a tunneling session is established between the relay servers 13 and 23 by acceptance of the connection request command (step S7).

The aforementioned processing from step S1 to step S7 is typically performed by an operator during the initial set-up of a network. The operator performs an operation of registering in the SIP-server 4 a relay server on a LAN which is intended to be connected through the Internet 3. Moreover, the operator performs an operation of registering in the relay server a communication terminal which is intended to carry out communications through the Internet 3.

Next, as shown in FIG. 6, the relay server 13 sends local account information LA1 to the relay server 23 by a MESSAGE method (step S8). The MESSAGE method preferably is directly sent to the relay server 23 via no SIP-server. Alternatively, this communication may be carried out via the SIP-server 4.

The sequence diagram in FIG. 6 illustrates details of the local account information LA1 transferred in step S8. The local account information LA1 contains information about a communication terminal which is connected to the LAN 1 having the relay server 13 placed thereon and which performs account registration on the relay server 13. As described with reference to the sequence in FIG. 5, in this state, the communication terminals 11 and 12 perform account registration on the relay server 13; therefore, the local account information LA1 contains the account information of the communication terminals 11 and 12.

Upon reception of the local account information LA1, the relay server 23 registers the received information in the local account information database 104 thereof. However, the received account information is registered while being brought into correspondence with the account information of the relay server 13 which sent the account information. In such a case, each of the account (SIP:0001@privatesip1) of the communication terminal 11 and the account (SIP:0003@privatesip1) of the communication terminal 12 is registered while being brought into correspondence with the account (SIP:relay server1@sip.srv) of the relay server 13.

Next, the relay server 23 sends local account information LA2 to the relay server 13 by the MESSAGE method (step S9). The MESSAGE method preferably is directly sent to the relay server 13 via no SIP-server. Alternatively, this communication maybe carried out via the SIP-server 4.

The sequence diagram in FIG. 6 illustrates details of the local account information LA2 transferred in step S9. The local account information LA2 contains information about a communication terminal which is connected to the LAN 2 having the relay server 23 placed thereon and which performs account registration on the relay server 23. The relay server 13 registers the information in the local account information database 104 thereof. In such a case, the account (SIP:0002@privatesip2) of the communication terminal 21 and the account (SIP:relay server2@sip.srv) of the relay server 23 are registered in the local account information database 104 while being brought into correspondence with each other.

Thus, the relay server 13 and the relay server 23 exchange the local account information LA1 and the local account information LA2 with each other, and register the acquired information in the local account information databases 104 thereof, respectively. The communication terminals 11 and 12 connected to the LAN 1 access the relay server 13, thereby referring to the local account information database 104 of the relay server 13. For example, the users of the communication terminals 11 and 12 can refer to the contents of the local account information database 104 through an operation of referring to an address book. Similarly, the communication terminals 21 and 22 connected to the LAN 2 can refer to the local account information database 104 of the relay server 23.

Next, it is assumed herein that the user of the communication terminal 11 must carry out communications with the communication terminal 21. The user of the communication terminal 11 accesses the relay server 13 to refer to the address book. Then, the user designates the account (SIP:0002@privatesip2) of the communication terminal 21 to execute the communication processing with the communication terminal 21. Thus, the communication terminal 11 sends to the relay server 13 a SIP command addressed to the communication terminal 21 (step S10).

Upon reception of the SIP command which designates the communication terminal 21 as an address account, the relay server 13 refers to the local account information database 104, and specifies a relay server in which the relevant address account is registered. In this case, the account of the communication terminal 21 is registered while being brought into correspondence with the relay server 23; therefore, the relay server 23 is selected as a relay.

Thus, the relay server 13 receives the SIP command from the communication terminal 11, and then directly transfers the SIP command to the relay server 23 via the tunneling session (step S10.1). Further, the relay server 23 receives the SIP command from the relay server 13, and then transfers the SIP command to the communication terminal 21 (step S10.1.1). Through the aforementioned procedure, the SIP command sent from the communication terminal 11 is transferred to the communication terminal 21.

Upon reception of the SIP command from the communication terminal 11, the communication terminal 21 sends back a SIP response to the communication terminal 11. This response is directly transferred from the relay server 23 to the relay server 13 via the tunneling session again, and further is transferred to the communication terminal 11 via the relay server 13.

When the user of the communication terminal 12 must carry out communications with the communication terminal 21, the aforementioned processing is performed similarly. When the user of the communication terminal 12 executes communication processing which designates the account (SIP:0002@privatesip2) of the communication terminal 21, the communication terminal 12 sends to the relay server 13 a SIP command addressed to the communication terminal 21 (step S11).

Upon reception of the SIP command which designates the communication terminal 21 as an address account, the relay server 13 refers to the local account information database 104, and specifies a relay server in which the relevant address account is registered. Also in this case, the account of the communication terminal 21 is registered while being brought into correspondence with the relay server 23; therefore, the relay server 23 is selected as a relay.

The relay server 13 receives the SIP command from the communication terminal 11, and then directly transfers the SIP command to the relay server 23 via the tunneling session (step 11.1). Further, the relay server 23 receives the SIP command from the relay server 13, and then transfers the SIP command to the communication terminal 21 (step S11.1.1). In response thereto, the communication terminal 21 sends back a SIP response to the communication terminal 11. This response is directly transferred from the relay server 23 to the relay server 13 via the tunneling session again, and further is transferred to the communication terminal 11 via the relay server 13.

As described above, the use of the communication system according to this preferred embodiment allows the communication terminal on the LAN 1 to carry out communications with the communication terminal on the LAN 2, through the Internet 3.

According to this preferred embodiment, the SIP-server 4 connected to the Internet 3 does not necessarily control the accounts of all the communication terminals connected to this communication system in a collective manner. It is sufficient that the SIP-server 4 controls only the accounts of the relay servers. In the aforementioned processing, it is sufficient that the SIP-server 4 controls the account information of the relay servers 13 and 23. Accordingly, the accounts can be controlled in a distributed manner, which makes it possible to lessen a load imposed on the SIP-server 4.

The account information sent to the respective LANs are not collectively controlled by the SIP-server 4, but are controlled by the relay servers on the respective LANs. Then, the relay server which controls the account information sent to each LAN carries out communications with another relay server through the SIP-server to exchange the account information held thereby with the another relay server. Thus, the communication terminal on each LAN can acquire the account information of the communication terminal on another LAN via the relay servers on the respective LANs.

Further, the communication system according to this preferred embodiment has a feature in that the relay server controls the account information acquired from another relay server while bringing the account information into correspondence with the account information of the relay server which sends the account information. In the processing described with reference to FIG. 6, for example, the relay server 13 acquires from the relay server 23 the account information of the communication terminal connected to the LAN 2. The relay server 13 controls the acquired account information while bringing the account information into correspondence with the account information of the relay server 23. According to the communication system, therefore, the communication terminal can obtain an account freely in each LAN.

That is, when a unique account is provided to a communication terminal in each LAN, there is no possibility that identical accounts are provided to different LANs. This is because the account of the relay server is controlled by the SIP-server 4 so as to be unique. Thus, the accounts of all the communication terminals may not be collectively controlled in the entire communication system, which makes it possible to reduce a burden in account control. In the sequences illustrated in FIGS. 5 and 6, different domains are allocated to the communication terminals 11, 12 connected to the LAN 1 and the communication terminal 21 connected to the LAN 2. As described above, alternatively, the account can be freely set for each LAN. Therefore, there arises no necessity of identifying a domain name uniquely.

As described above, in addition, the communication system according to this preferred embodiment relays communication data between the communication terminals in an application protocol layer which is higher in order than the TCP/IP. In this preferred embodiment, that is, each of the relay servers 13 and 23 relays communication data between the communication terminals in a SIP layer. This allows communications between different LANs using an existing network system.

While the present invention has been described with respect to preferred embodiments thereof, it will be apparent to those skilled in the art that the disclosed invention may be modified in numerous ways and may assume many embodiments other than those specifically set out and described above. Accordingly, it is intended by the appended claims to cover all modifications of the present invention that fall within the true spirit and scope of the present invention.

What is claimed is:

1. A relay server comprising:
a first registration section arranged to register therein account information of a communication terminal on a local area network including the relay server, such that the account information of the communication terminal is associated with account information of the relay server;
a second registration section arranged to request registration of the account information of the relay server in an external server on a wide area network;
a construction section arranged to construct a communication session between the relay server and at least one other relay server via the external server and to construct a relaying communication session directly between the relay server and the at least one other relay server;
an exchange section arranged to exchange the account information of the communication terminal that has been associated with the account information of the relay server by the first registration section with account information of at least one other communication terminal that has been registered in the at least one other relay server; and
a relay section arranged to:
receive from the communication terminal on the local area network a communication request designating account information of one communication terminal from among the at least one other communication terminal registered in the at least one other relay server;
determine one relay server from among the at least one other relay server associated with the designated account information of the one communication terminal from among the at least one other communication terminal based on the account information exchanged by the exchange section; and
relay communication data between the communication terminal and the one communication terminal from among the at least one other communication terminal via the relaying communication session between the relay server and the one relay server from among the at least one other relay server.

2. The relay server according to claim 1, wherein the exchange section is arranged to store therein the account information of the communication terminal, obtained by the exchange with the at least one other relay server, while bringing the account information into correspondence with the account information of the at least one other relay server.

3. The relay server according to claim 1, wherein the relay section relays the communication data between the communication terminal and the one communication terminal from among the at least one other communication terminal at an application protocol level higher in order than a TCP/IP.

4. The relay server according to claim 1, wherein the first registration section stores therein the account information of the communication terminal and a local IP address of the communication terminal while bringing the account information into correspondence with the local IP address.

5. The relay server according to claim 4, wherein the first registration section also stores therein a password for authentication of the communication terminal.

6. The relay server according to claim 1, wherein the second registration section requests registration of the account information of the relay server and a global IP address of the relay server in the external server.

7. The relay server according to claim 6, wherein the second registration section requests registration of a password for authentication of the relay server.

8. The relay server according to claim 1, wherein the external server is a SIP server.

9. The relay server according to claim 1, wherein the exchange section exchanges the account information by a MESSAGE method of a SIP.

10. The relay server according to claim 1, wherein the wide area network is the Internet.

11. The relay server according to claim 1, wherein the relaying communication session is a tunneling session.

* * * * *